United States Patent
Chang

[19]

[11] Patent Number: 6,098,527
[45] Date of Patent: Aug. 8, 2000

[54] STRUCTURE OF A STEAMING APPARATUS

[76] Inventor: Rong-Kuan Chang, P.O. Box 82-144, Taipei, Taiwan

[21] Appl. No.: 09/240,662

[22] Filed: Feb. 2, 1999

[51] Int. Cl.[7] ............................... A21B 1/00; A23L 1/00; A47J 27/00; H05B 1/00

[52] U.S. Cl. ............................... 99/330; 99/417; 99/467; 99/473; 99/483; 126/20; 126/369; 219/401

[58] Field of Search ............................. 99/330–333, 339, 99/340, 403, 410, 417, 416, 467, 468, 473–476, 481, 482, 483, 516; 126/348, 369, 20, 369.2, 281, 391; 219/400, 401, 362, 389, 492; 312/236; 426/510, 511, 496, 523, 407, 418

[56] References Cited

U.S. PATENT DOCUMENTS

| | | | |
|---|---|---|---|
| 3,456,598 | 7/1969 | MacKay | 99/330 X |
| 3,518,949 | 7/1970 | Stock | 99/330 X |
| 4,010,349 | 3/1977 | Lee | 99/474 X |
| 4,189,995 | 2/1980 | Lohr et al. | 99/417 X |
| 4,373,430 | 2/1983 | Allen | 99/483 X |
| 4,455,924 | 6/1984 | Wenzel | 426/523 X |
| 4,460,822 | 7/1984 | Alden et al. | 126/20 X |
| 4,641,630 | 2/1987 | Meister | 126/369 X |
| 4,674,402 | 6/1987 | Raufeisen | 219/401 X |
| 4,839,502 | 6/1989 | Swanson et al. | 99/417 X |
| 5,072,666 | 12/1991 | Hullstrung | 99/483 X |
| 5,532,456 | 7/1996 | Smith et al. | 99/467 X |
| 5,802,963 | 9/1998 | Cohn et al. | 99/330 X |

*Primary Examiner*—Timothy F. Simone

[57] ABSTRACT

A steaming apparatus comprising a steaming box having an inner wall and an outer wall, a burner, and a water boiler being mounted at the bottom of the inner wall, characterized in that the water boiler comprises an inner channel and an outer channel, the inner channel has a facing down opening and is provided with a plurality of water tubes, the external wall of the inner channel is provided with a plurality of smoke-releasing connection tubes. The outer channel has a facing up opening and is provided with a plurality of smoke-releasing tubes, which are connected to the smoke-releasing connection tubes of the inner channel, a passage is formed between the inner channel and the outer channel, and is used for the storage of water. The burner mounted at the bottom of the water boiler heats the water boiler and the temperature of the water therein rapidly increases and the water boils to form steam.

15 Claims, 14 Drawing Sheets

STRUCTURE OF A STEAMING APPARATUS

BACKGROUND OF THE INVENTION (a) Field of the Invention

The present invention relates to an improved structure of a steaming apparatus, and in particular, to a steaming apparatus which is used to steam food within an enclosed steaming box by heating water with a water boiler until steam is formed. The apparatus provides excellent and rapid steaming of food within a few minutes, and the temperature, humidity and pressure within the steaming box can be controlled and regulated.

(b) Description of the Prior Art

In conventional steaming device, a water boiler mounted at the bottom of a steaming box is used as a cooking wok having a heating device at the bottom thereof. Only after heating for 15 to 20 minutes, the water within the steaming box changes to steam. In this prior art, the heating process is too slow and it is a waste of energy.

Another drawback of the prior art is that a high pressure is developed within the closed steaming box if it is heated by the water boiler for a long period of time. As the pressure outside the steaming box is lower than that inside the steaming box, automatically supply of water to the steaming box is not possible, and therefore, water supply to the steaming box has to be done manually.

The conventional prior art is normally provided with an opened-type water boiler without any cover to cover up the steam which produced by the boiler. Thus, when the water is at the boiling point, steam thus formed raises from the bottom to the top of the steaming box. As such the corners of the steaming box may not have steam supply or with little steam supply. As a result, the food placed at the corners of the steaming box may not have sufficiently steamed.

Another drawback of the conventional prior art is that the steam-releasing tube at the top end of the steaming box causes a loud sound when the high pressure steam is released and passes through the tube. This sound shall become a loud noise if the steaming box is in operation for a long time. In addition, there is no regulator or controller to control the volume of the released smoke at the smoke-releasing tube and therefore, the temperature, the humidity and the pressure within the steaming box cannot be effectively regulated or controlled.

SUMMARY OF THE INVENTION

Therefore, the present invention has been made in light of the above drawbacks of the conventional steaming device, and it is an object of the present invention to provide a steaming apparatus in which effective steam is produced to steam food within 2 to 3 minutes.

It is another object of the present invention to provide a steaming apparatus which shorten the time required to form steam from water, and save heat energy.

It is yet another object of the present invention to provide a steaming apparatus, wherein the heating time required within the steaming box is very short, and foods can be easily steamed without excessive water being absorbed by the food.

It is yet another object of the present invention to provide a steaming apparatus, wherein water supply to the steaming box is automatically without further attention to the steaming box.

It is a further object of the present invention to provide a steaming apparatus, wherein the loud noise produced by the steaming box can be reduced to a minimum by means of a silencer.

It is a further object of the present invention to provide a steaming apparatus, wherein the humidity, the temperature and the pressure of the steaming box can be regulated or controlled.

Other and further objects and features of the present invention will become obvious upon an understanding of the illustrative embodiments about to be described in connection with the accompanying drawings or will be indicated in the appended claims, and various advantages not referred to herein will occur to one skilled in the art upon embodying of the invention in practice.

DETAILED DESCRIPTION OF THE PREFERRED EMBODIMENT

Figure 1:
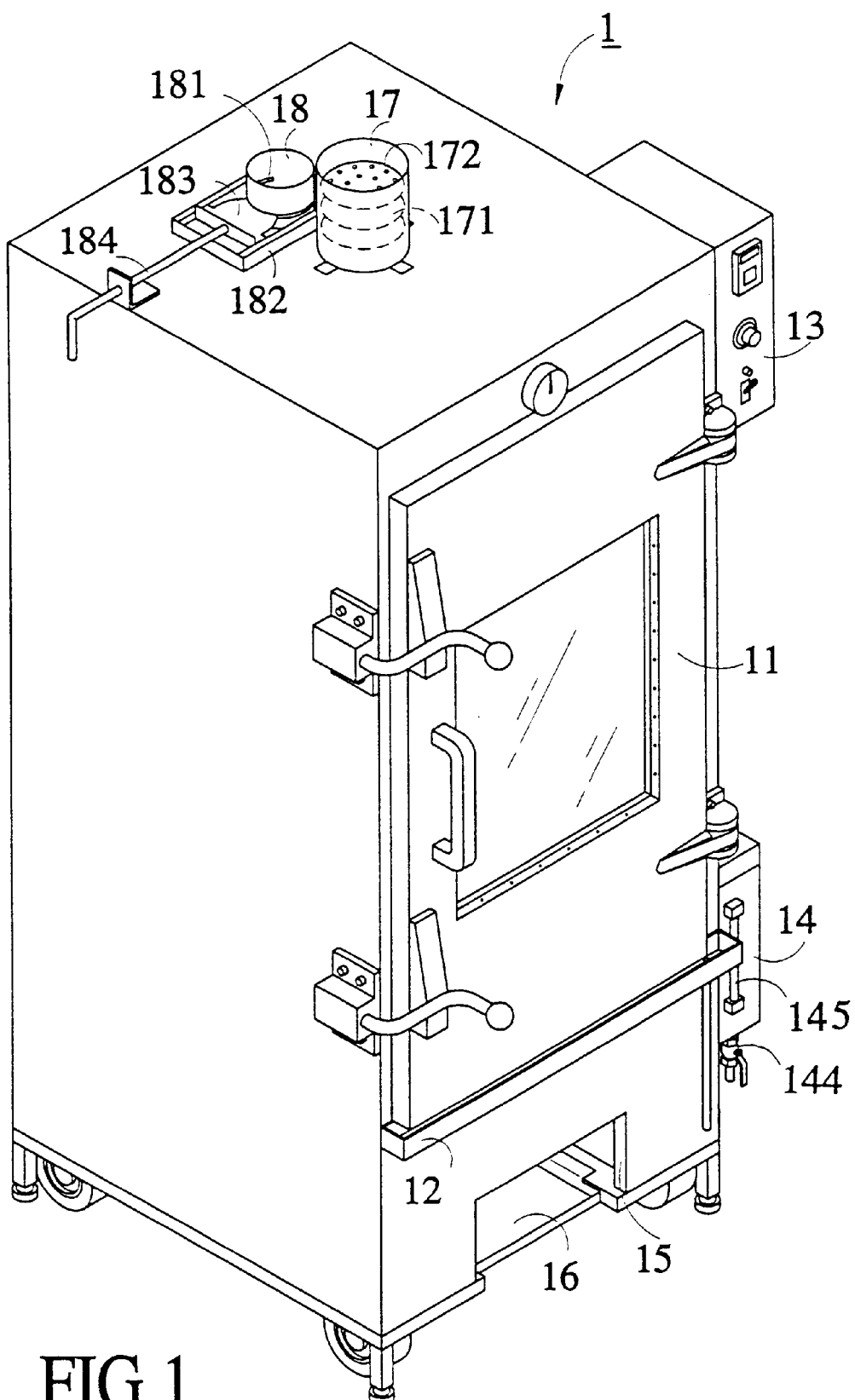
FIG. 1 is a perspective view of the steaming box in accordance with the present invention.

Referring to drawings, FIG. 1 is a perspective view of the steaming apparatus. In FIG. 1, the steaming apparatus has a cupboard like box as a steaming box 1 having a door 11 being mounted at the front wall of the steaming box 1. At the bottom edge of the door 11 a horizontal is provided slot 12. As shown in the figure, a thermometer and a timer control box 13 are provided at one outer corners of the steaming box 1. A water tank 14 is mounted at one lower outer corner of the steaming box 1. A rectangular opening 15 for the mounting of a tray 16 is provided at the lower section of the box 1. This tray 16 is used to hold burning device, for instance, a gas stove. The top end of the steaming box 1 is mounted with a steam silencer 17 and a smoke-releasing tube 18 which can regulate the flow rate of the released steam. The silencer 17 and the smoke-releasing tube 18 can be connected to other guiding tubes (not shown) which lead to the surrounding.

Figure 2:
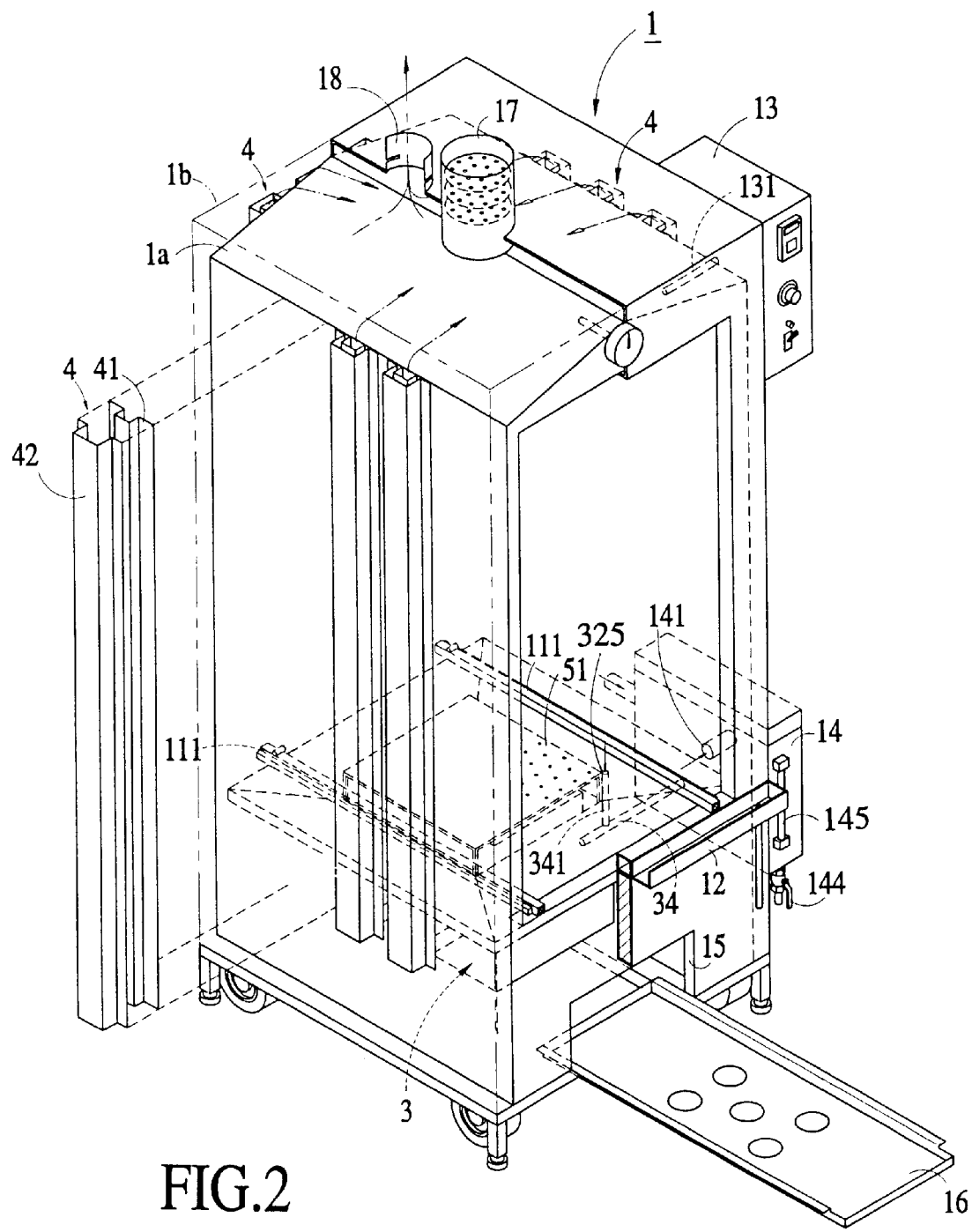
FIG. 2 is an exploded view, showing the internal structure of the steaming box in accordance with the present invention.

FIG. 2 is a perspective view, partially exploded, of the steaming box 1 in accordance with the present invention. As shown in the figure, the steaming box 1 includes an inner wall 1a and an outer wall 1b and an appropriate space is allocated in between the two walls 1a, 1b. At the bottom of the interior of the inner wall 1a, a water boiler 3 being mounted on a pair of rails 111 is provided. The external surfaces (except the front surface being the door 11) of the inner wall 1a are provided with a plurality of vertical smoke-guiding tubes 4. These tubes 4 can be either formed in a single unit tube 4 or a double tubes (inner tube and outer tube) 41, 42. For this instance, the inner tube 41 is used to lead the smoke and the external tube 42 is used as a reinforcement of the inner wall 1a. A space is provided in between the outer tube 42 and the inner tube 41 and is used to insulate heat transfer and to prevent heat from reaching the outer wall 1b of the steaming box 1.

Figure 3:
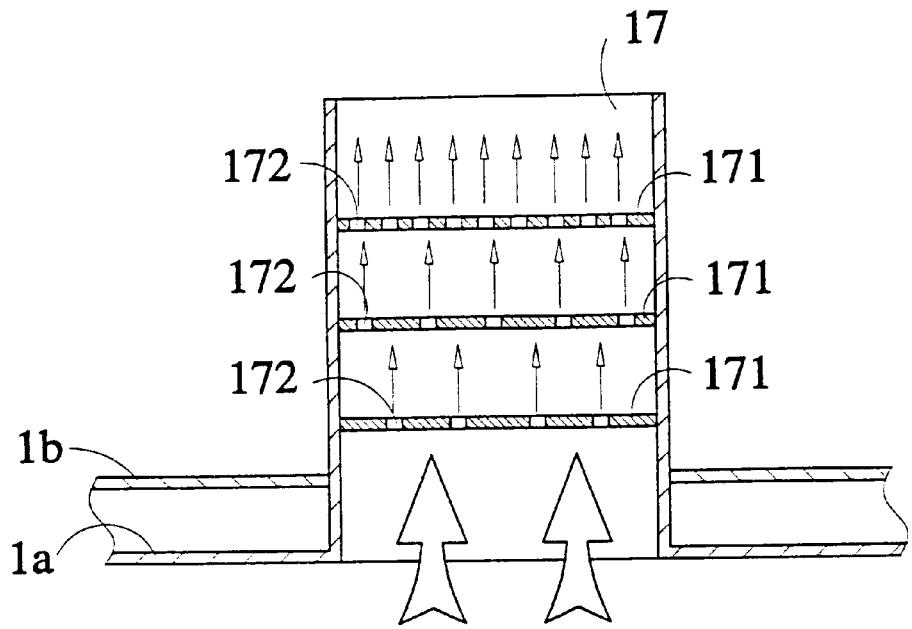
FIG. 3 is a sectional view of the steam silencer of the steaming box in accordance with the present invention.

The top end of the inner wall 1a is connected to the steam silencer 17 and the silencer passes through the external wall 1b. Thus, the steam of the inner wall 1a passes out to the surrounding via the silencer 17. For the reason that the released high pressure steam causes a loud noise, a plurality of horizontal plates 171 (refer to FIG. 3) are evenly spaced and mounted within the silencer 17. On each plate 171, a plurality of rows of steam-releasing holes 172 are provided. The number of steam-releasing holes 172 decreases from the top horizontal plate to the bottom plate 171. When the steam passes through the silencer 17, due to the multiple layers of the plates and the steam-releasing holes 172, the noise will be reduced to a minimum.

Figure 4:
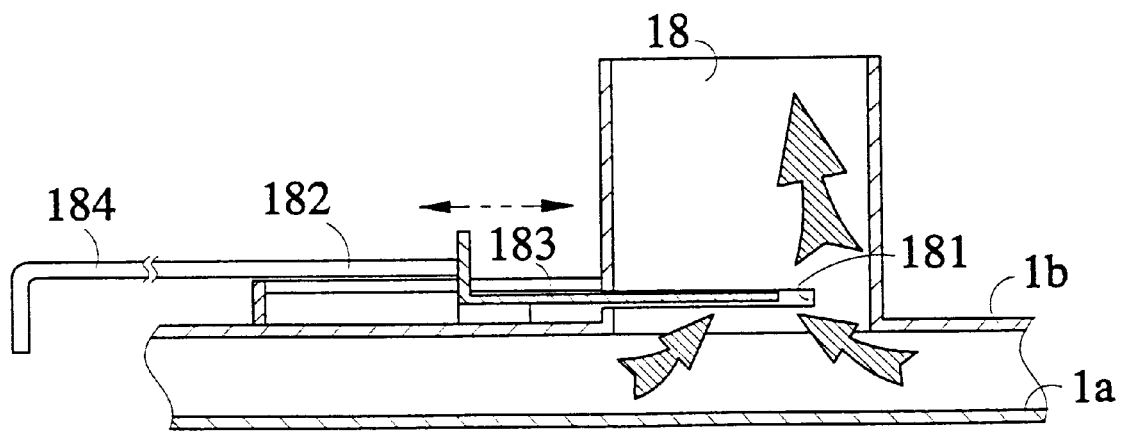
FIG. 4 is a sectional view of the smoke-releasing tube in accordance with the present invention.

The smoke-releasing tube 18 is connected to the top end of the external wall 1b. The smoke-releasing tube 18 allows the smoke/fog produced by the water boiler 3 to be released to the surrounding via the smoke-guiding tube 4. As the flow rate of the released smoke affects the temperature, humidity and pressure of the steaming box 1, the lower section of the smoke-releasing tube 18 is provided with a notch 181 (referring to FIGS. 1 & 4). A trough 182 is provided at the exterior of the notch 181. A covering plate 183 is provided within the trough 182. The front end of the covering plate 183 can be inserted into the notch 181. A push rod 184 is mounted at the rear end of the covering plate 183. By moving the covering plate 183 with a push rod 184, the flow rate of the smoke of the smoke-releasing tube can be changed. When the mouth of the smoke-releasing tube 18 increases, the rate of smoke-releasing is great and the heating of the steaming box 1 increases. Thus the interior temperature of the steaming box 1 increases. If vice versa, the temperature within the steaming box 1 decreases.

Figure 5:
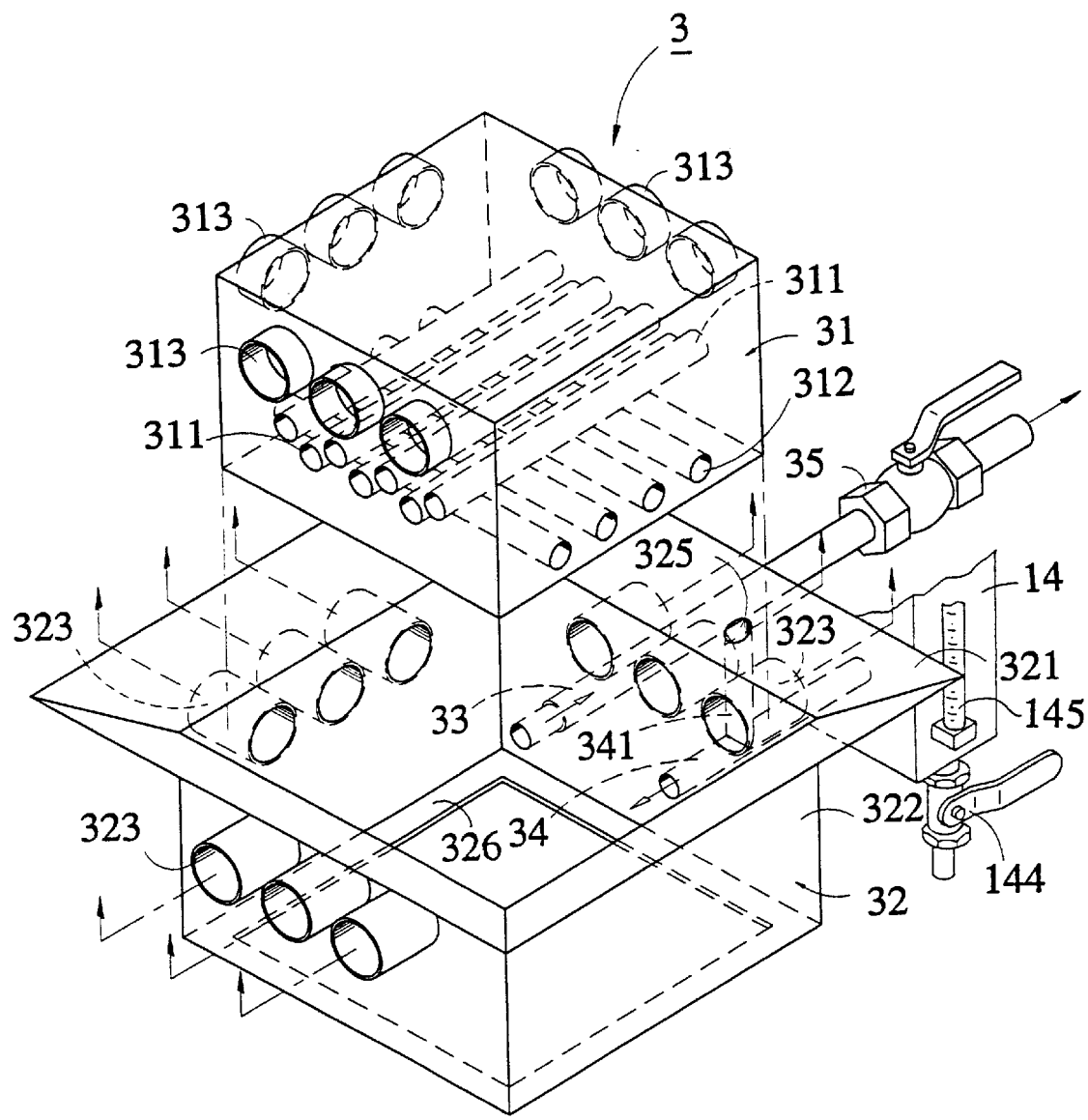
FIG. 5 is an exploded perspective view of the water boiler in accordance with the present invention.

The water boiler 3 is mounted at the bottom of the inner wall 1a. The structure of the water boiler 3 is shown in FIG. 5, which comprises an inner channel 31 and an outer channel 32. The inner channel 31 is a pentagon shape having no bottom face, but with a facing-down opening. The interior of the inner channel 31 is provided with alternately arranged horizontal and perpendicular water tubes 311, 312, or with parallel arranged of a plurality of parallel water tubes. The three boundaries (expect the front face) of the inner channel 31 are provided with a plurality of protruded smoke-releasing connection tubes 313.

Figure 6:
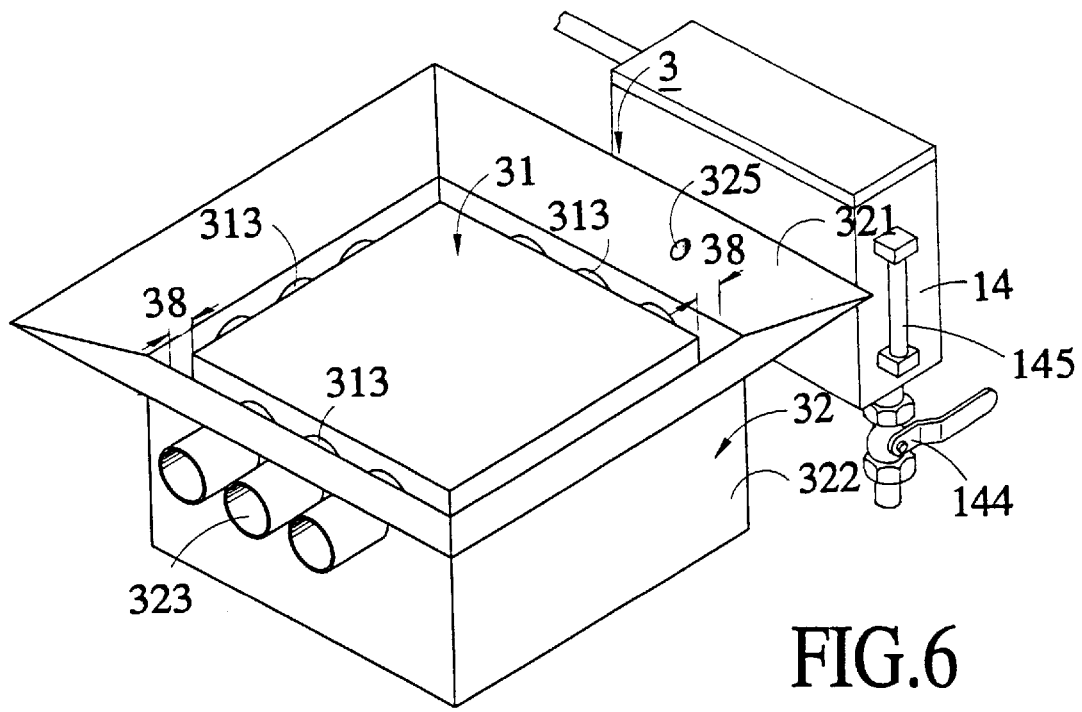
FIG. 6 is an exploded perspective view of the water boiler and the water tank in accordance with the present invention.

The other end of the smoke-releasing connection tubes 313 is connected to the smoke-releasing connection tubes 323 of the outer channel 32. The outer channel 32 includes a conic-shaped channel 321 and a water storage channel 322 formed as a unit and having a facing-up opening. The bottom end of the outer channel 32 is a boundary frame 326. As the surface area of the water storage channel 322 is larger than that of the inner channel 31, after the inner channel 31 has been inserted into the water storage channel 322, the bottom edge of the inner channel 31 and the boundary frame 326 of the outer channel 32 are welded together such that a passage 38 (as shown in FIG. 6) is formed in between the inner channel 31 and the outer channel 32 for the storage of water.

The area of the conic-shaped channel 321 is larger than that of the water storage channel 322 and the surrounding boundaries of the conic-shaped channel 321 is welded to the inner wall 1a, and the three boundaries (except the front face) are provided with a plurality of smoke-releasing connection tube 323. The smoke-releasing connection tube 323 is connected to the smoke-releasing connection tube 313 of the inner channel 31 (refer to FIG. 6). Thus, when a fire source is used to heat the bottom of the inner channel 31, black smoke thus produced passes through the smoke-releasing connection tubes 313,323 via the smoke-guiding tube 4 and then releases to the surrounding.

In accordance with the present invention, and as shown in FIG. 5, one face of the water storage channel 322 is provided with a horizontal water-releasing tube 33 and a horizontal water-in tube 34, wherein the water-releasing tube 33 is connected to a water-releasing valve 35, which is used to drain the used water from the water storage channel 322. The water-in tube 34 connects to the water tank 14 so that water can be supplied to the water storage channel 322. The water-in tube 34 is also connected to a horizontal pressure-lowering tube 341. The top end of the pressure-lowering tube 341 is in communication with the conic-shaped channel 321 such that a pressure-lowering hole 325 is formed on the conic-shaped channel 321.

Figure 7:
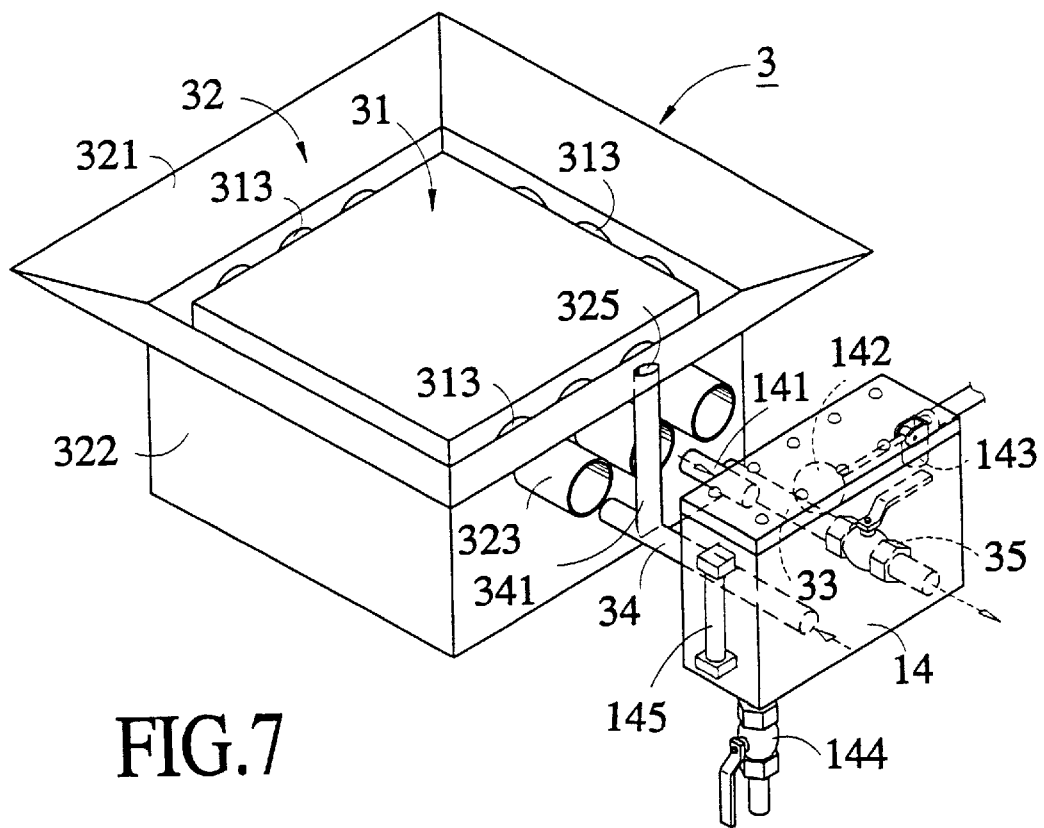
FIG. 7 is a perspective view of the water boiler and the water tank in accordance with the present invention.

FIG. 7 is a perspective view of the water boiler and the water tank in accordance with the present invention. At the front face of the water tank 14, a water level gage 145 is mounted and the lateral wall of the tank 14 is provided with a pressure-lowering tube 141. The other end of the pressure-lowering tube 141 is inserted into the inner wall 1a of the steaming box 1 (refer to FIGS. 2 and 8). The pressure-lowering tube 141 and the other horizontal pressure-lowering tube 341 are used to balance the pressure of the steaming box 1. Because of the pressure-lowering tubes 141, 341, the pressure of the water tank 14 and that within the steaming box 1 can be easily and rapidly come to a balance so that the water in the water storage tank 14 can smoothly flow into the water boiler 3. In addition, an electrical floats ball switch 142 and a water-in valve 143 are mounted within the water tank 14, and at the bottom section of the tank 14, a water-releasing valve 144 is provided so that when the water level within the water tank 14 is insufficient, the water-in valve 143 will automatically supply water thereto, and when water supply is cut off or the water level is insufficient, the electrical float ball switch 142 will cause to produce an alarm sound.

Figure 9:
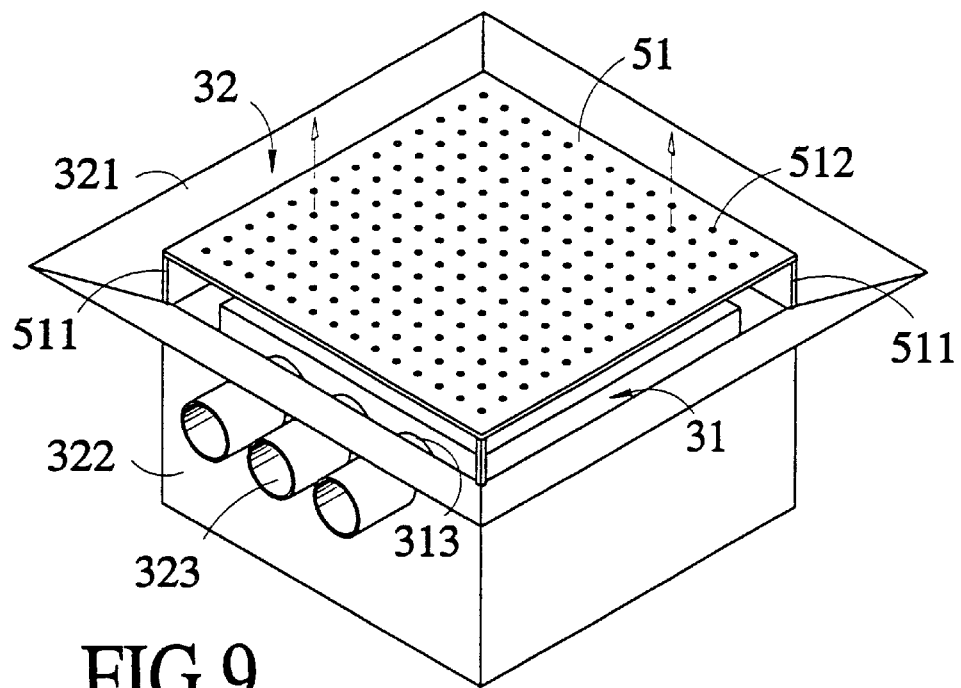
FIG. 9 is a perspective view of an opened-type net-like cover and the water boiler in accordance with the present invention.

FIG. 9 is a perspective view of an opened type net-like frame and the water boiler 3 in accordance with the present invention. The top section of the water boiler 3 can either fully be opened or closed with a cover. Thus, if a cover is used, the net-like cover 51 as shown in the figure can be employed. The net-like cover 51 is supported at its edges with the supports 511 standing on the conic-shaped channel 321. The surface of the cover 51 is provided with a plurality of small holes 512.

Figure 10:
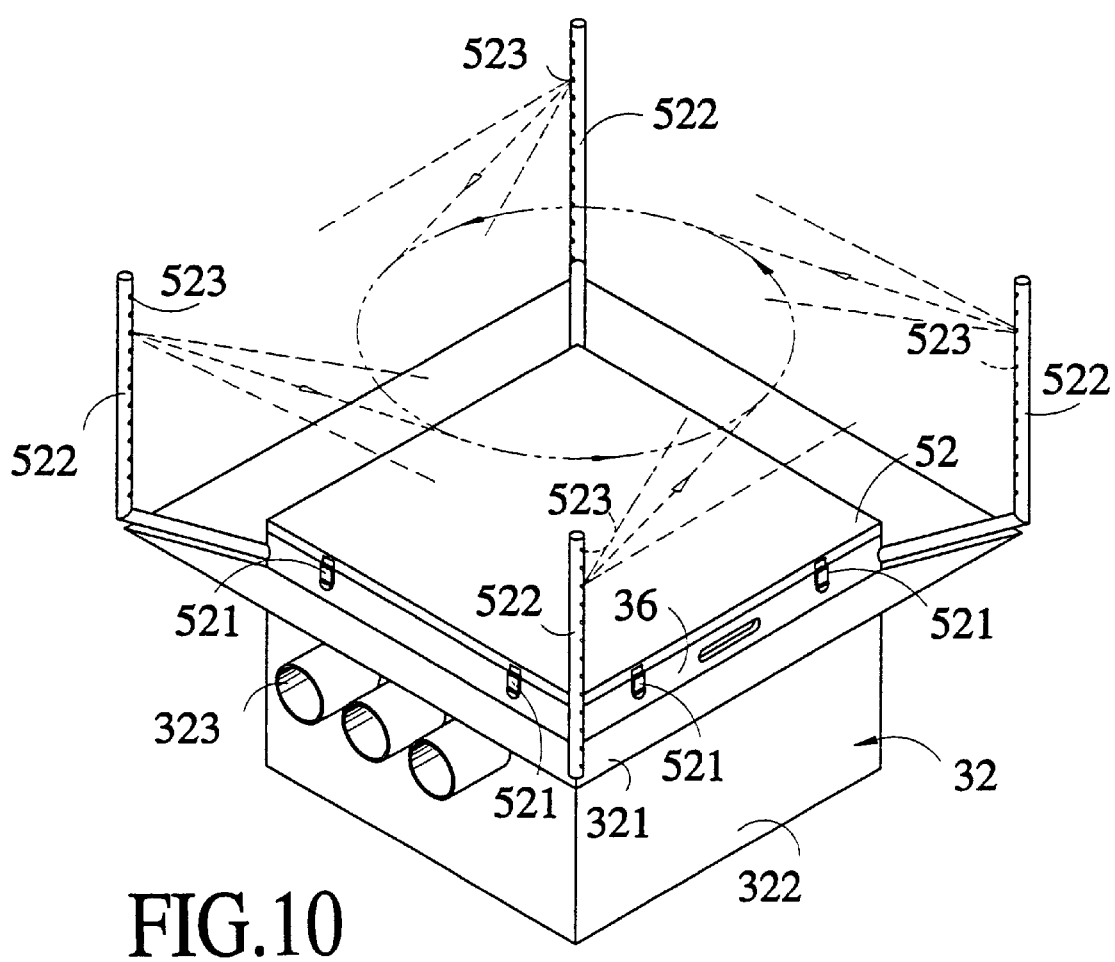
FIG. 10 is a perspective view of a closed-type, pressure-increasing cover and the water boiler in accordance with the present invention.
Figure 11:
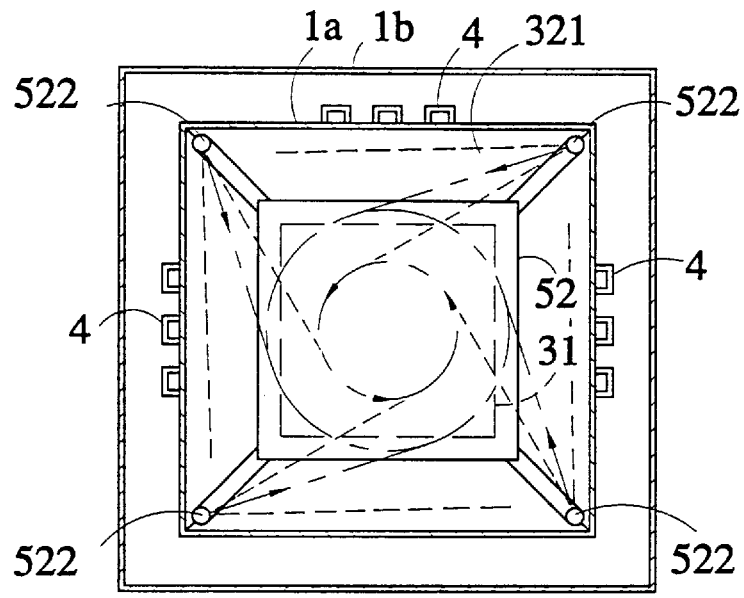
FIG. 11 is a top view of FIG. 10 in accordance with the present invention.

FIG. 10 is a perspective view of a closed type, pressure-increasing cover and the water boiler in accordance with the present invention. As shown in the figure, the top section of the water boiler 3 is extended and formed a boundary edge 36, and the boundary edge 36 is fastened to the pressure-increasing cover 52. A press fastener 521 is used to fasten the cover 52 and the boundary edge 36. In addition, the surrounding edge of the pressure-increasing cover 52 is extended out with a plurality of the ejection tubes 522 having a plurality of ejection holes 523 thereon. As these holes 523 are formed with an inclined angle, (as shown in FIG. 11) the ejected high pressure steam will form a circulating stream of steam within the steaming box 1

Figure 12:
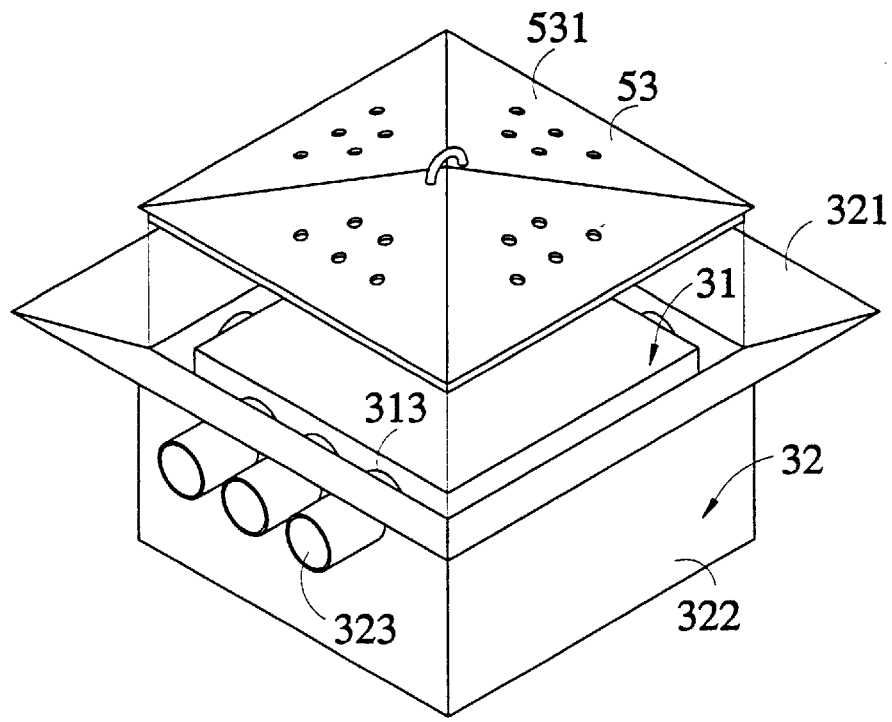
FIG. 12 is a perspective view of the water boiler and the detachable cover in accordance with the present invention.

FIG. 12 is a perspective view of the water boiler and the detachable cover in accordance with the present invention. As shown in the figure, the cover 53 can close the water storage channel 322 of the water boiler 322 and the surface of the cover 53 is provided with a plurality of steaming holes 531 for the releasing of the steam. A handle is provided at the center of the cover 53 for easy lifting of the cover 53.

Figure 8:
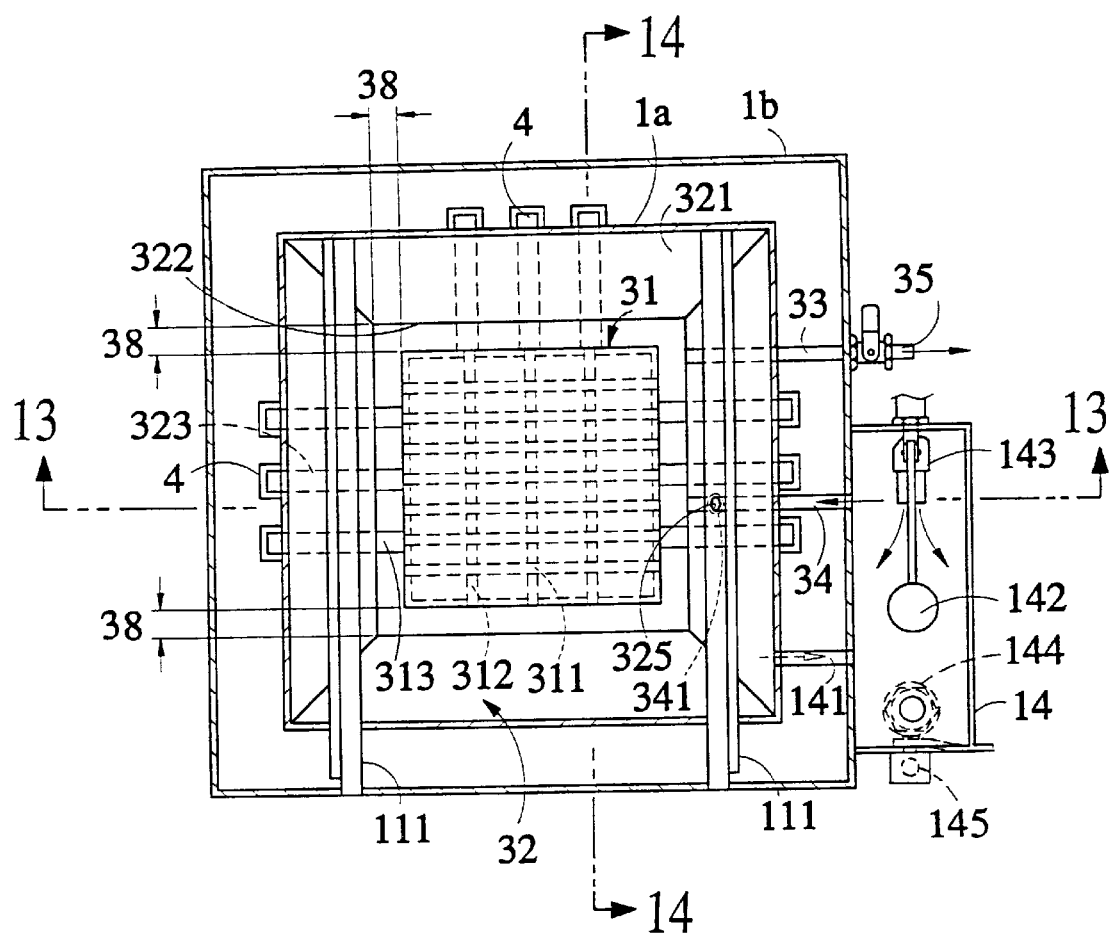
FIG. 8 is a top sectional view of the water boiler and the water tank in accordance with the present invention.
Figure 13:
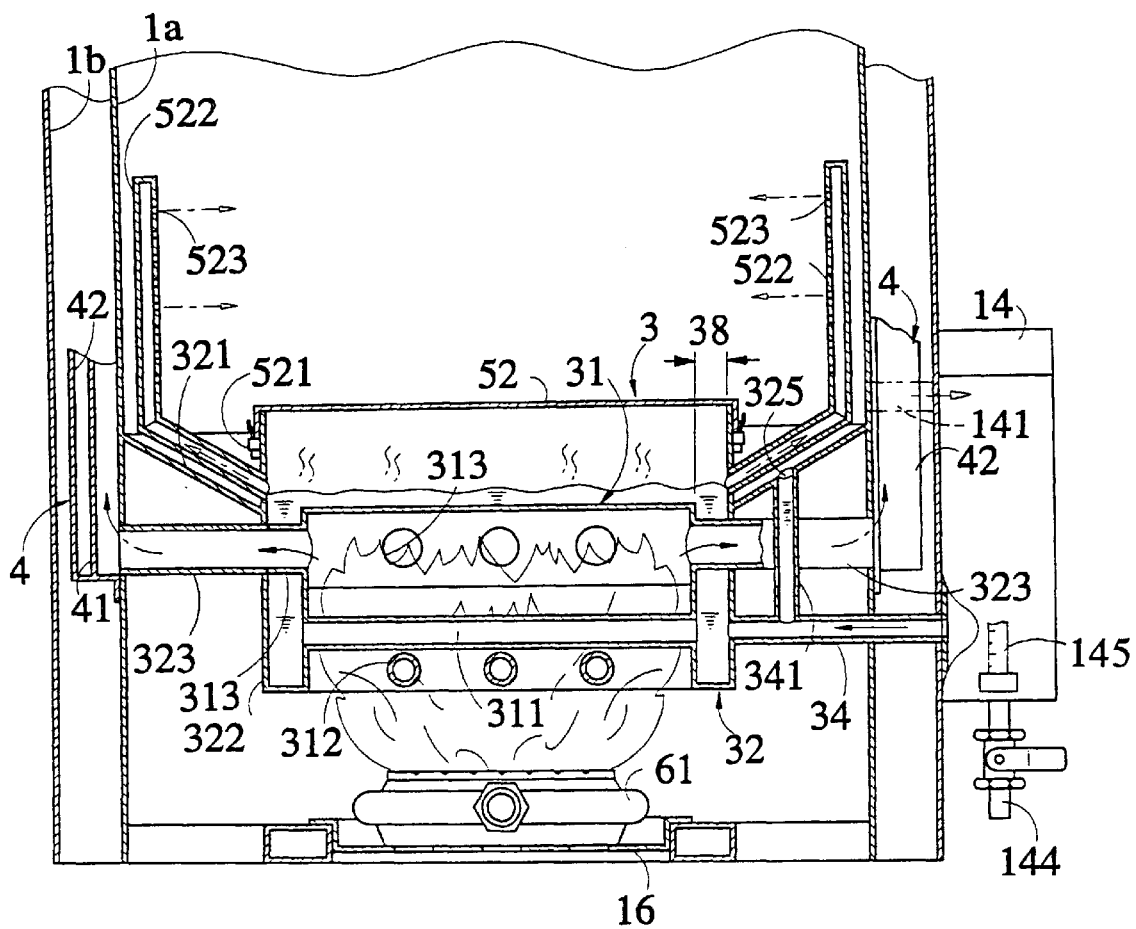
FIG. 13 is a sectional view along line 13—13 of FIG. 8 in accordance with the present invention.
Figure 14:
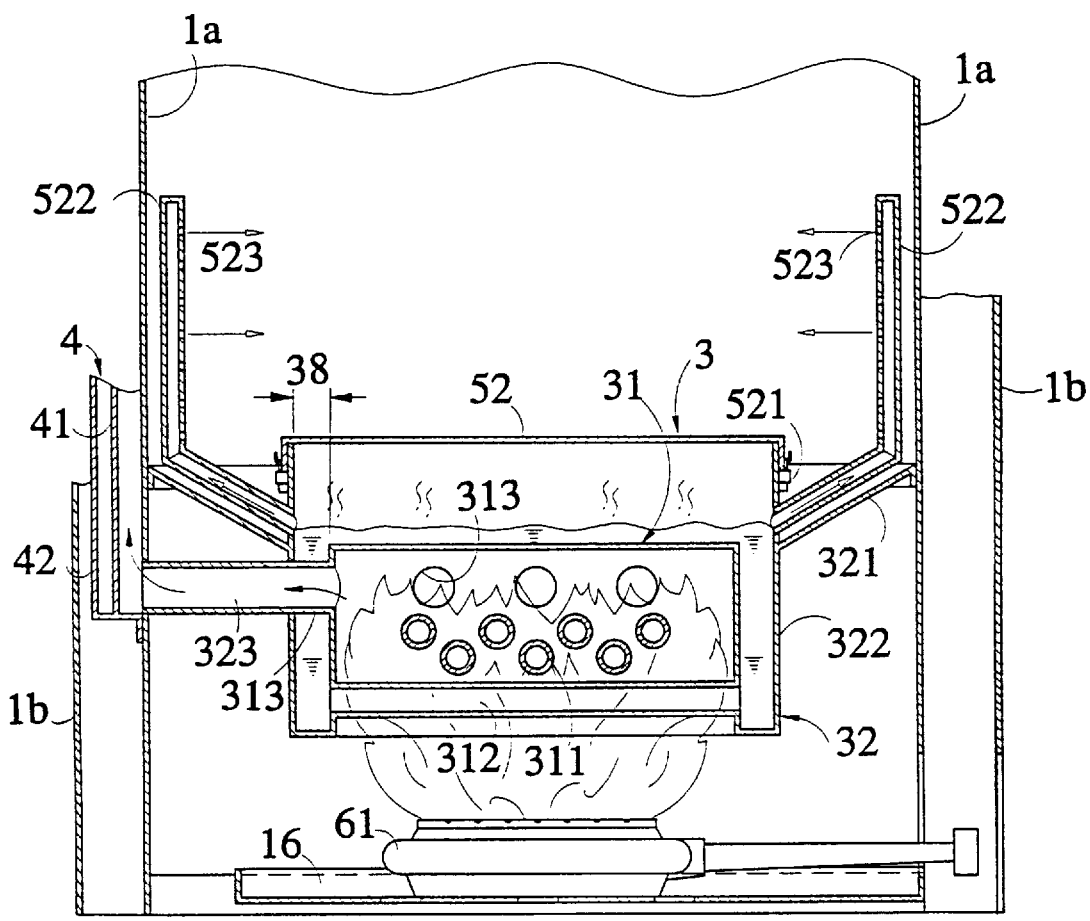
FIG. 14 is a sectional view along line 14—14 of FIG. 8 in accordance with the present invention.

FIGS. 13 and 14 are sectional views of the steaming box 1, and are also the sectional view along line 13—13, 14—14 of FIG. 8. As shown in the figures, the steaming box 1 includes an inner wall 1a and an outer wall 1b. The water storage channel 322 includes an inner channel 31, and a passage 38 is formed in between the inner channel 31 and the water storage channel 322. As the interior of the inner channel 31 is provided with perpendicularly and horizontally arranged water tubes 311, 312, the water stream can flow to everywhere via the tubes 311, 312. At the bottom of the water boiler 3, a burning device 61 is used to heat the inner channel 31 at five different faces (front, rear, left, right and top face) and a plurality of water tubes 311, 312 are heated, such that the heating surface increases. Thus, the energy is sufficiently utilized to cause the water temperature to elevate to the boiling point of water and form steam. The produced smoke is released upward via the smoke-releasing connection tube 313, 323 and the smoke-guiding tube 4. The water tank 14 has the same pressure with that of the steaming box 1 by means of the two pressure-lowering tubes 341, 141, so as to allow the water of the water tank 14 to automatically supply to the water boiler 3.

If the top section of the water boiler 3 is mounted with the pressure-increasing cover 52, then a closed space is formed within the water boiler 3, such that the high pressure steam can be ejected out via the ejection holes of the ejection tube 522, and a circulating stream of steam is produced within the steaming box 1.

Figure 15:
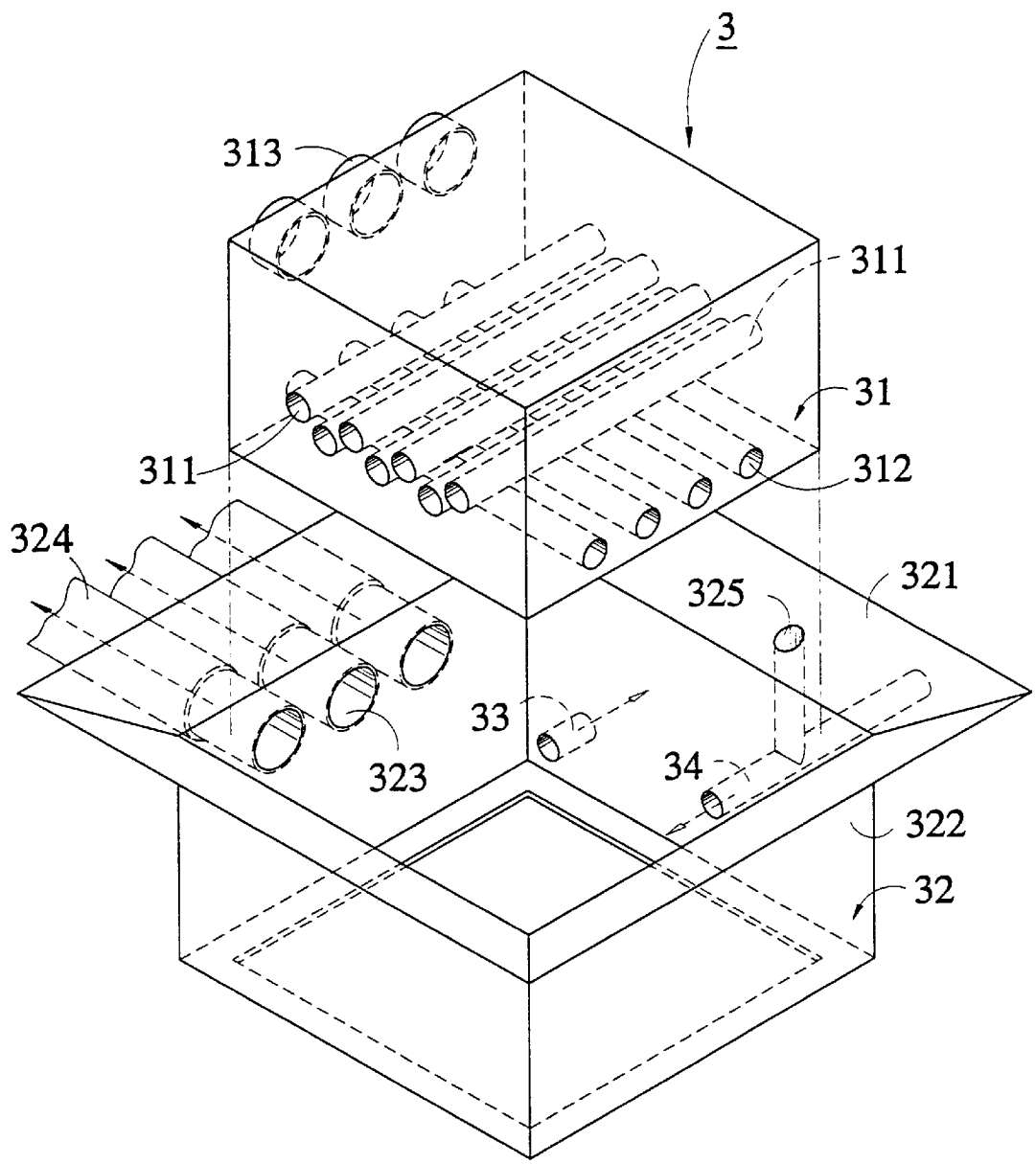
FIG. 15 is a perspective view of another water boiler in accordance with the present invention.

FIG. 15 is a perspective view of another water boiler in accordance with the present invention. In this preferred embodiment, the water boiler 3 includes an inner channel 31 and an outer channel 32. But, only the rear face of the water storage channel 322 of the outer channel 32 is provided with a smoke-releasing connection tube 323 (the other 3 faces do not provided with this tube), and the said tube 323 is mounted with a heat resistant guiding tube 324. By means of the heat resistant guiding tube 324, the smoke is released to the outside from the bottom section of the steaming box 1.

Figure 16:
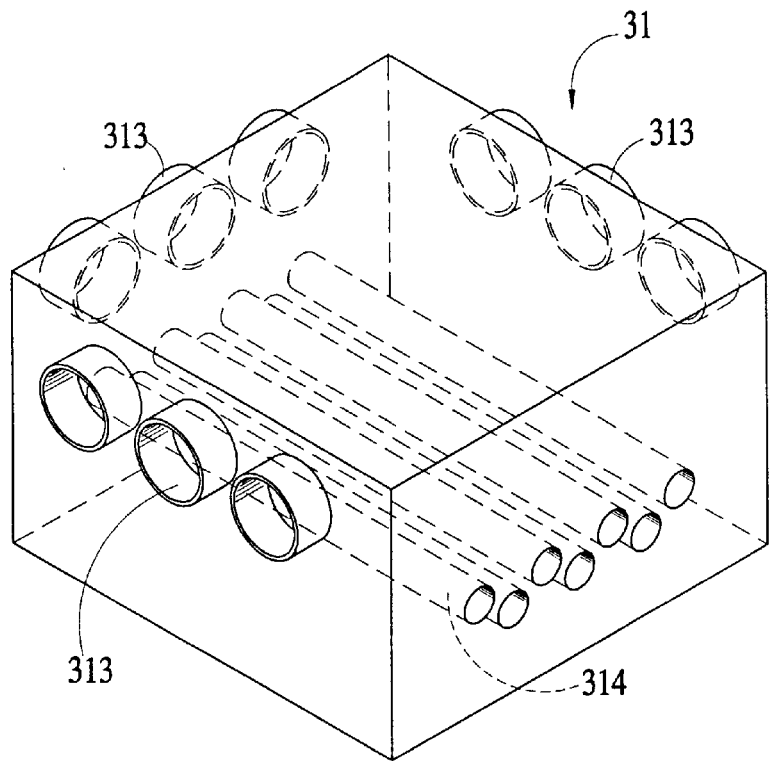
FIG. 16 is a perspective view of a further water boiler in accordance with the present invention.
Figure 17:
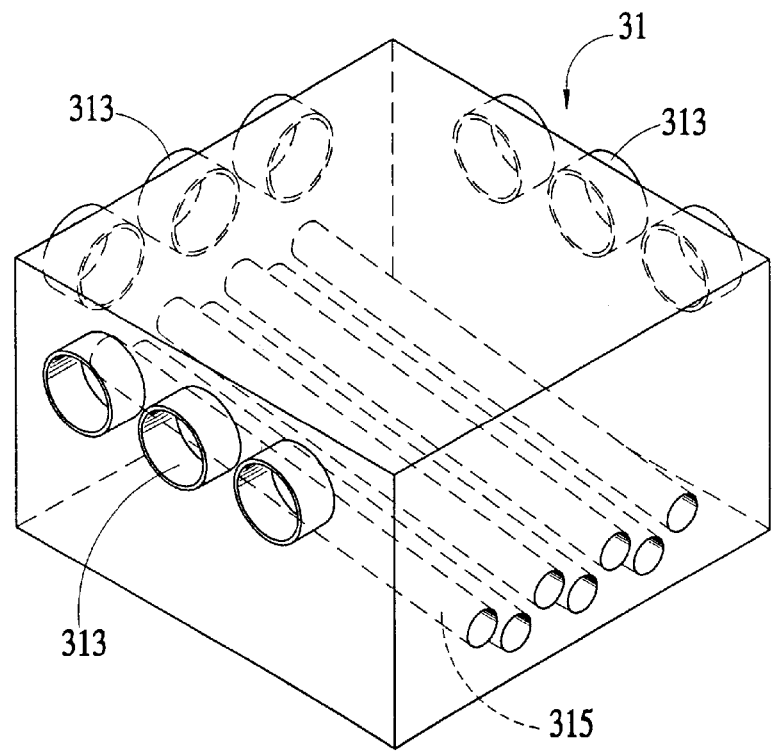
FIG. 17 is a perspective view of another water boiler in accordance with the present invention.

FIG. 16 is a perspective view of another water boiler in accordance with the present invention. In this embodiment, the water tubes 314 within the inner channel 31 are arranged in parallel. FIG. 17 is also another water boiler in accordance with the present invention. As shown in the figure, the water tubes 315 within the inner channel 31 are arranged in parallel but with an inclined angle.

Figure 18:
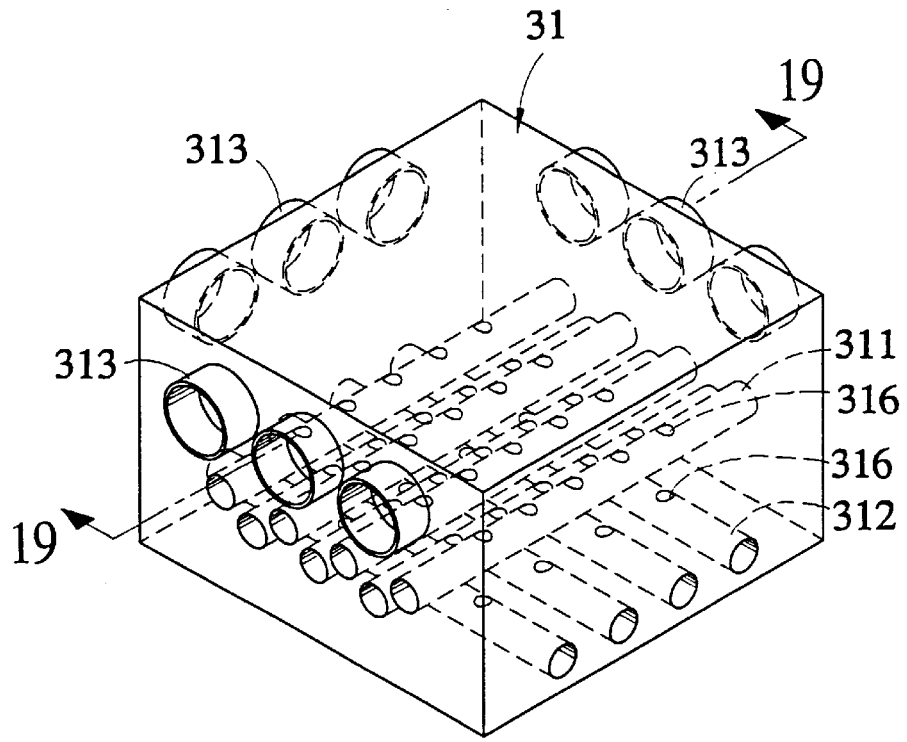
FIG. 18 is a perspective view of another water boiler in accordance with the present invention.
Figure 19:
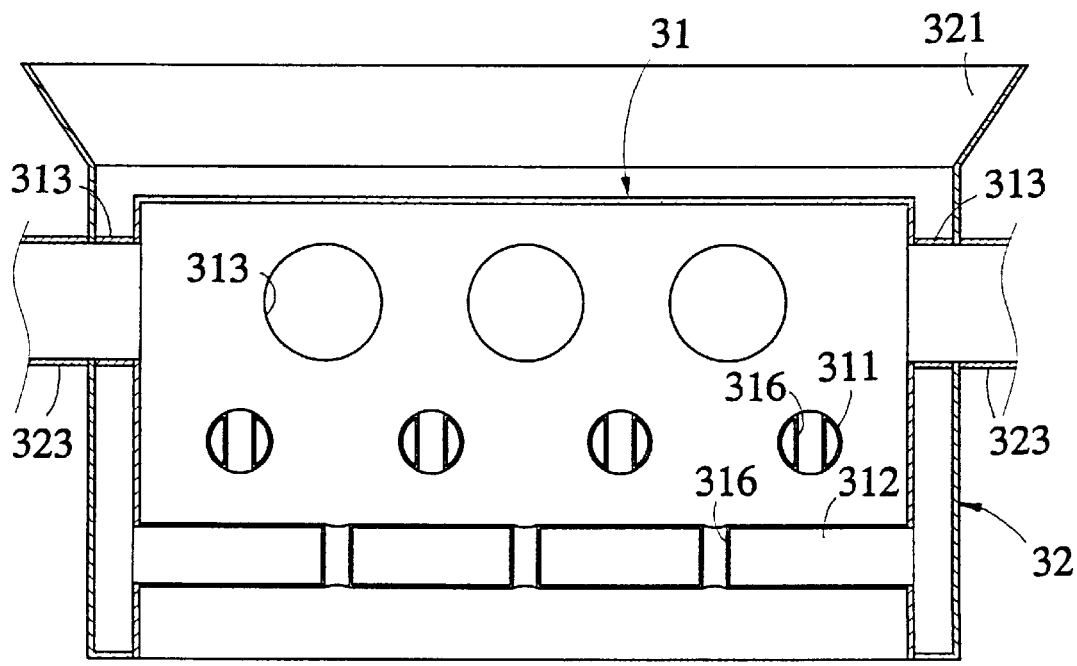
FIG. 19 is a sectional view along line 19—19 of FIG. 18 in accordance with the present invention.

FIG. 18 is a perspective view of another water boiler in accordance with the present invention, and FIG. 19 shows a sectional view along line 19—19 of FIG. 18. As shown in the figures, the water tubes 314 (or 311, 312 or 315) of the inner channel 31 can be provided with a plurality of inner tubes 316. The inner tubes 316 allow heat energy to smoothly flow in between the tubes so as to cause the water temperature to raise and to provide excellent heating efficiency.

Figure 20:
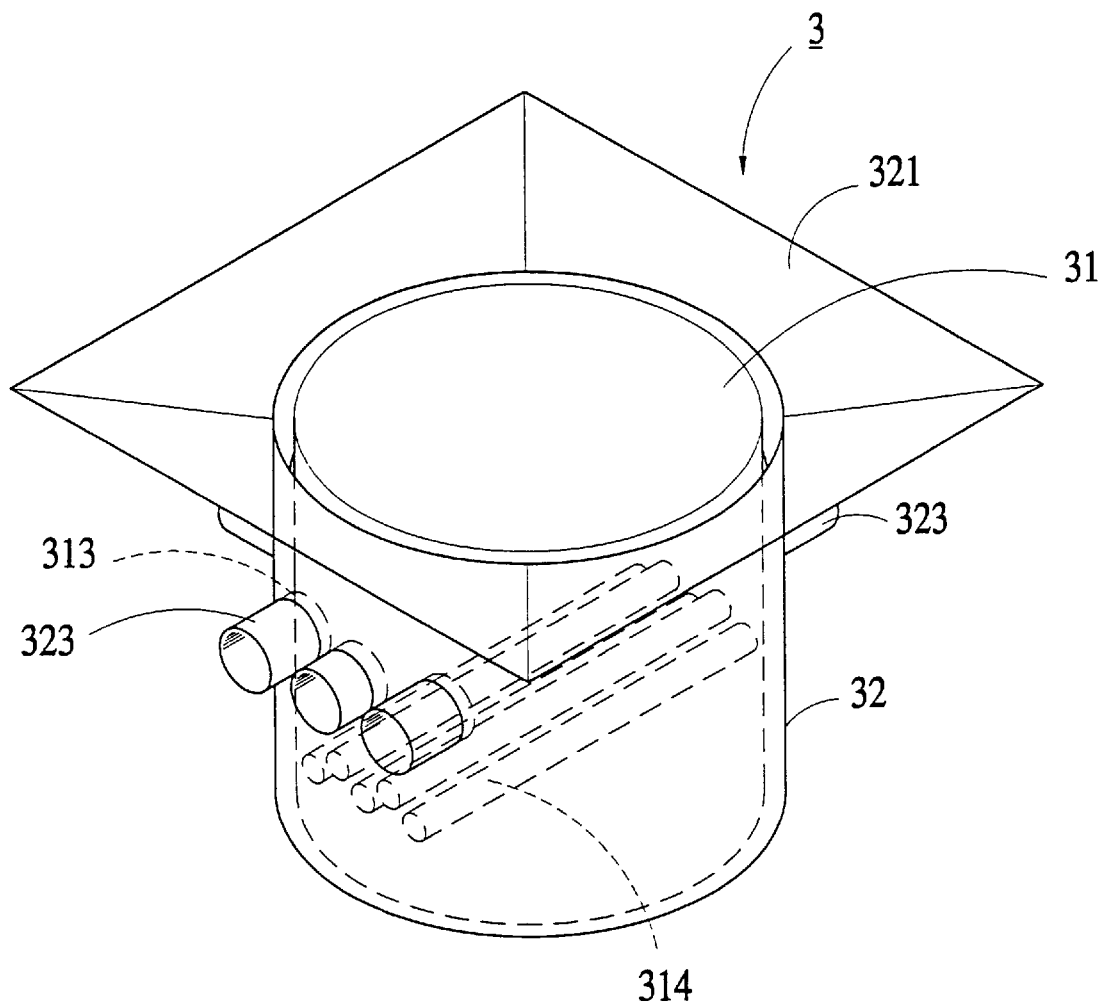
FIG. 20 is a perspective view of another water boiler in accordance with the present invention.

FIG. 20 shows a perspective view of another water boiler in accordance with the present invention. As shown in the figure, the water boiler 3 is circular shape having a circular inner channel 31 and an outer channel 32, and the shape of the conic-shaped channel 321 can be varied in accordance with the shape of the steaming box 1. In accordance with the present invention, the circular or square shaped water boiler 3 can be used in any type of steaming box 1.

Various modifications will become possible for those skilled in the art after reading the teachings of the present disclosure without departing the scope thereof.

I claim:

1. A steaming apparatus comprising a steaming box having an inner wall and an outer wall, a burner, and a water boiler being mounted at the bottom of the inner wall, characterized in that:

the water boiler comprises an inner channel and an outer channel, the inner channel has a facing down opening and is provided with a plurality of water tubes, the external wall of the inner channel is provided with a plurality of smoke-releasing connection tubes;

the outer channel has a facing up opening and is provided with a plurality of smoke-releasing tubes, which are connected to the smoke-releasing connection tubes of the inner channel, a passage is formed between the inner channel and the outer channel, and is used for the storage of water;

thereby the burner being mounted at the bottom of the water boiler heats the water boiler and the temperature of the water therein rapidly increases and the water boils to form steam.

2. A steaming apparatus as set forth in claim 1, wherein the outer channel is a combination of a conic-shaped channel and a water storage channel and the conic-shaped channel is on top of the water storage channel.

3. A steaming apparatus as set forth in claim 2, wherein the outer wall of the steaming box is mounted with a water tank being connected to the outer channel of the water boiler by a water-in tube, the water-in tube is provided with a perpendicular pressure-lowering tube and the conic-shaped channel is connected and in communication with the top end of the perpendicular pressure-lowering tube.

4. A steaming apparatus as set forth in claim 3, wherein the pressure-lowering tube is mounted in between the inner wall of the steaming box and the water boiler.

5. A steaming apparatus as set forth in claim 1, wherein the top section of the conic-shaped channel is mounted with a net-like cover being supported at the edge of the channel with a plurality of supports securing on the water boiler, and a plurality of small holes are provided on the cover for the releasing of steam.

6. A steaming apparatus as set forth in claim 1, wherein the top section of the conic-shaped channel is mounted with a closed-type pressure-increasing cover having a plurality of ejection holes thereon, a plurality of ejection tubes are protruded from the surrounding of the cover and the ejection holes are arranged with an inclined angle such that the ejected steam from the ejection holes forms a circulating stream of steam within the interior of the steaming box.

7. A steaming apparatus as set forth in claim 1, wherein the top section of the conic-shaped channel is covered with a detachable cover being capable of closing the opening of the outer channel of the water boiler, the surface of the cover is provided with a plurality of holes for steam releasing.

8. A steaming apparatus as set forth in claim 1, wherein the external edge of the inner wall of the steaming box is provided with a smoke-guiding tube having a bottom section connected to the smoke-releasing connection tube of the outer channel for the releasing of smoke.

9. A steaming apparatus as set forth in claim 8, wherein the smoke-guiding tube includes an inner tube and an outer tube, and the inner tube is used for smoke guiding and the outer tube is used for reinforcement and heat insulation for the steaming box.

10. A steaming apparatus as set forth in claim 1, wherein the top end of the inner wall of the steaming box is provided with a silencer passed through the top face of the outer wall, a plurality of horizontal plates are provided in the silencer and a plurality of steam releasing holes are provided on the surface of the plates.

11. A steaming apparatus as set forth in claim 1, wherein the top end of the outer wall of the steaming box is provided with a smoke-releasing tube having a notch at the lower section thereof, a trough is provided at the outside of the notch, and a covering plate is provided to the trough.

12. A steaming apparatus as set forth in claim 1, wherein the water tubes within the inner channel are arranged in parallel and horizontally.

13. A steaming apparatus as set forth in claim 1, wherein the water tubes within the inner channel are arranged in parallel but in a slanting position.

14. A steaming apparatus as set forth in claim 1, wherein the water tubes within the inner channel are alternately arranged in parallel and perpendicular to each other.

15. A steaming apparatus as set forth in claim 12, 13 or 14, wherein a plurality of inner tubes are insertable within the water tubes.

* * * * *